United States Patent [19]

Bhatt

[11] Patent Number: 4,658,362

[45] Date of Patent: Apr. 14, 1987

[54] PROCESS MODELING FOR SUPERPLASTIC FORMING OF METAL SHEETS

[75] Inventor: Dhananjay D. Bhatt, Cerritos, Calif.

[73] Assignee: McDonnell Douglas Corporation, Long Beach, Calif.

[21] Appl. No.: 685,534

[22] Filed: Dec. 24, 1984

[51] Int. Cl.[4] .................. G06F 15/46; G05B 13/02; B21D 31/00; B21D 22/10

[52] U.S. Cl. ........................ 364/472; 364/148; 364/478; 72/364; 72/60; 148/11.5 R

[58] Field of Search ............... 72/60, 342, 364, 38, 72/20; 29/421 R; 364/472, 468, 477, 478, 148, 149, 152, 178; 148/11.5 R

[56] References Cited

U.S. PATENT DOCUMENTS

| | | | |
|---|---|---|---|
| 4,233,829 | 11/1980 | Hamilton et al. | 72/364 |
| 4,233,831 | 11/1980 | Hamilton et al. | 72/364 |
| 4,257,093 | 3/1981 | Peirson et al. | 364/472 |
| 4,299,111 | 11/1981 | Fayal et al. | 72/364 |
| 4,368,509 | 1/1983 | Li | 364/148 |
| 4,472,770 | 9/1984 | Lii | 364/148 |
| 4,474,044 | 10/1984 | Leistner et al. | 72/364 |
| 4,489,579 | 12/1984 | Daime et al. | 72/60 |
| 4,516,419 | 8/1985 | Agrawal | 72/364 |
| 4,539,645 | 9/1985 | Krorttinger et al. | 364/478 |

Primary Examiner—Jerry Smith
Assistant Examiner—Jon D. Grossman
Attorney, Agent, or Firm—Henry M. Bissell; George W. Finch; John P. Scholl

[57] ABSTRACT

Methods for developing particular models which accurately predict the material, process and design parameters for superplastic forming of metal parts under optimum conditions consistent with the desired properties in the finished part. Generalized control equations are developed which enable designers to develop consistency of the forming parameters for materials from different lots. The invention permits control of superplastic forming in accordance with particular raw material microstructure and the effects of time, temperature, strain and strain rate during superplastic forming on the material microstructure, and establishes the relationship between the microstructure and the properties of the parts being formed. These methods applied to the specific area of superplastic forming of metal sheets exemplify a more generalized method of conducting systematic research to derive the maximum information from a minimum number of experiments involving available data.

27 Claims, 9 Drawing Figures

PROCESS MODELING FOR SUPERPLASTIC FORMING OF METAL SHEETS

BACKGROUND OF THE INVENTION

1. Field of the Invention

This invention relates to metal fabrication techniques and in particular to methods for optimizing manufacturing variables as a function of material properties.

2. Description of the Prior Art

One of the most important challenges facing the aerospace industry is cost reduction of structures in today's high performance aircraft. Improvements in the use of expensive raw materials, such as titanium alloys, and in the efficiency of the processes required for fabrication of airframe structures provide a major avenue for reduction of system acquisition costs.

In recent years, attention has been focsued on reducing these costs by developing manufacturing processes that improve material utilization factors and that can produce net or near-net parts. Superplastic forming (SPF) and superplastic forming combined with diffusion bonding (SPF/DB) are two such processes which offer substantial cost savings by reducing the number of detail parts and mechanical fasteners, by achieving more efficient load carrying structures, and by increasing the fly-to-buy ratio of titanium alloys. While these two processes offer substantial savings, their full potential has not yet been realized, one reason being the lack of guidelines to aid the designer in achieving producible configurations with acceptable finished properties.

The superplastic forming/diffusion bonding (SPF/DB) process simultaneously utilizes two phenomena occurring in titanium alloys. One phenomenon, called superplasticity, is the ability of a metal to elongate extensively under low applied stresses at elevated temperatures without localized thinning. The other phenomenon is solid-state diffusion bonding, for which titanium is particularly suited. With this ability to severely form and readily bond, the need to machine, cut, form, drill and assemble small details is virtually eliminated and thus lightweight, monolithic aircraft structures can be produced at low cost.

During SPF and SPF/DB, sheet alloys are exposed to high temperatures for long periods of time. This exposure causes microstructural changes, including grain growth and redistribution of the alpha-beta phases. These changes during SPF/DB are undesirable because they can degrade the finished part properties, decrease high temperature ductility, and increase the flow stress required for superplastic deformation. The large grain size resulting from SPF degrades many room temperature mechanical properties. Decreased high temperature ductility can increase forming time and/or pressure or cause failure of parts during forming.

The grain growth occurring during the superplastic forming causes the flow stress required for further deformation to increase, thus resulting into microstructural hardening. Until recently, it was assumed that the microstructure of titanium alloys did not change during the superplastic deformation and thus the microstructural hardening was neglected. Most of the data available in the literature on this subject relate the flow stress ($\sigma$) to the strain rate ($\dot{\epsilon}$) using the following equation:

$$\sigma = K\dot{\epsilon}^m \quad (1)$$

where K and m are constants dependent on test parameters, such as temperature and strain rate. m is called the strain rate sensitivity exponent and has considerable significance in determining the stability of flow.

This widely used relationship, however, does not take into account the microstructural hardening resulting from the concurrent grain growth. Thus, the pressure profile predicted using the relationship of Equation (1) will result in underforming or fracture of the part.

All these problems tend to increase in-process scrap and manufacturing costs. In order to reduce the in-process scrap and to get good quality finished parts consistently and without significant degradation of the finished properties, the microstructural hardening which results from the microstructural changes occurring during forming should be taken into account. However, such design considerations can be followed only if the microstructural changes occurring during superplastic forming can be predicted under various forming conditions.

Superplasticity is a phenomenon of very large (200 percent or greater) neck-free extensions of alloy specimens in tensile deformation at elevated temperatures and within a small range of strain rates. Superplasticity can be induced both in materials possessing a stable, ultra-fine grain size at the temperature of deformation greater than $0.4T_m$ ($T_m$ is the absolute melting temperature) and in those subjected to special environmental conditions, such as thermal cycling through a phase change. These two categories are best described as "structural" and "environmental" superplasticity, respectively. The present invention is concerned with the "structural" type of superplasticity.

Various hypotheses and theoretical models have been developed to account for the superplasticity phenomenon. One of the earliest interpreted the behavior of an elongated alloy in terms of the then popular "amorphous cement" theory of inter-crystalline cohesion, wherein it was suggested that rolling partially converted the metal into an amorphous condition and the elongation was the result of flow in the amorphous regions. Others have attributed the effect to the presence of a very fine grain size, a condition now known to be necessary for the occurrence of structural superplasticity.

Over the past 20 years or so, considerable interest and research activity have been directed to investigating the superplasticity phenomenon. As the number of alloys exhibiting structursal superplasticity has increased, earlier theories have been found inadequate. The more recently developed theories are based on either considerations that take into account the actual atomic structure of the metallic materials or rheologcy (continuum treatments with or without the incorporation of microstructural details like grain size). These various theories and models, however, are generally found to be deficient, for one reason or another, in providing equations and operating hypotheses of sufficient validity and reliability to enable one to use them in a production environment.

Without going into the details of the contemporary atomistic theory relating to superplasticity, a few of the applicable considerations may be noted. The essential requirements for the occurrence of superplasticity include deformation temperature greater than $0.4T_m$ ($T_m$ is the melting temperature), so that diffusional mechanisms are dominant; fine equiaxed grain structure with grain size less than 10 to 15 microns, so flow stresses are low and the grain boundary sliding contribution to strain is large; and a two-phase microstructure to retard grain coarsening.

Macroscopically, the reason for the extensive elongations and the stability of the flow is that the strain rate sensitivity of the flow stress ($m = \partial \ln \sigma / \partial \ln \dot{\epsilon}$) is high (greater than 0.4) at its deformation temperature and within a certain range of strain rates. Several experiments utilizing optical and scanning electron microscopy indicate that grain boundary sliding is an important deformation mode. The fact that voids do not form in the bulk of the material (the density does not change appreciably during deformation) shows that grains change their shape to accommodate the grain boundary sliding.

The principal mechanical properties of superplastic alloys can be considered as divided into three stages. At low ($1 \times 10^{-6}$ to $1.5 \times 10^{-5}$) and high ($1.5 \times 10^{-3}$ to 0.1) values of strain rate, strain rate sensitivity (m) is low, while at intermediate values (approximately $1 \times 10^{-4}$ to $1 \times 10^{-3}$), m is high, which produces superplastic behavior. In the third stage (high values of strain rate) behavior of the superplastic alloys is similar to conventional materials deformed at high temperature. The intermediate stages are characterized by high values of the strain rate sensitivity parameters, whereas in the first stage deformation occurs at extremely low strain rates. Deformation at low strain rates causes longer high temperature exposure of the alloys, which results in substantial grain growth.

Different atomistic models have been proposed by investigators to explain the behavior of superplastic materials. These models have led to defining relations between stress, strain, strain rate, temperature, grain size and other atomistic parameters of the material. Most such models apply to only one of three stages referred to above. Some investigators have tried to explain the stress-strain rate behavior over the three stages by combining different single-stage models.

In the third stage, different dislocation creep models have been employed to explain the superplastic behavior. In the second regime, all experimental observations show that grain boundary sliding plays an important role during deformation. To prevent formation of cavities at triple junctions, grain boundary sliding may be accomplished by controlling mechanisms, such as boundary migration, lattice or boundary diffusion, and dislocation creep in neighboring grains.

As the phenomeneon of superplasticity moves from the laboratory into the production arena, the need for quality and process control during superplastic forming becomes increasingly important. This calls for laboratory characterization of superplastic metals which can reflect their behavior in actual forming applications. Such requirements are not limited to determining tensile elongations under optimum superplastic condition, but include detailed characterization of constitutive relations for superplastic flow, since a reasonably accurate control of pressurization cycle during forming is required. Real problems arise in this area because of the complexity associated with microstructural changes occurring simultaneously during forming.

Many investigators have tried to define the relationship between the flow stress and the strain rate during the elevated temperature deformation, and this relationship has been described through Equation (1) hereinabove. In working with that equation, the flow stress versus strain rate data are obtained from step strain rate tests in which the tensile specimen is subjected to varying pulling speeds and the stress at which the load becomes level at each speed is plotted against the strain rate for that speed in the form of a log-log curve of the measured variables. Quantitative values of strain rate sensitivity are then determined from the slope of the curve.

Even though this technique has been used by several investigators to characterize the superplastic flow behavior, there are some major deficiencies in this approach such as:

(a) The step strain rate test is used only up to small strain levels. The information obtained from a relativey short test ignores the microstructural changes occurring during the superplastic deformation over large strains.

(b) For a constant strain value for each strain rate, the time at temperature is longer for slow strain rates and shorter for fast strain rates. This causes differences in structure due to grain growth. Hence the data obtained are not reliable.

(c) Because the grain growth occurs as a function of time at temperature, the microstructure in the early stages of the test is much different than that in the final stages of the test. This will give additional increase in the flow stress. This grain-growth induced hardening, however, is not corrected for by this technique.

The method of the present invention relates particular material properties and manufacturing variables to the forming characteristics and physical properties of the specific items being formed by SPF and SPF/DB in a manner which optimizes the forming process.

SUMMARY OF THE INVENTION

In brief, methods in accordance with the present invention involve the development of general equations relating flow stress to various parameters, such as strain rate, strain or time, temperature and microstructure and the use of the equations in conjunction with tests conducted on samples of material batches from which parts are formed by SPF and SPF/DB, incorporating the parameters of the tested material in the generalized equation for use in forming parts from the batch materials. I have determined that, for alpha beta titanium alloys, the generalized relationships between the stress ($\sigma$), strain rate ($\dot{\epsilon}$), temperature (T), instantaneous beta phase grain size (L), beta phase grain size just prior to initiation of forming but after heat-up and soak periods (L0), initial beta phase grain size (L00) of the as-received material, and time (t) are as follows:

$$\dot{\epsilon} = \frac{A2\, \sigma^{n2}}{L^a\, T^b} \exp(-B2/T) \tag{2}$$

where A2, n2, a, b and B2 are particular constants for a given alloy. L is given by $$L = L0 + A1\, t^{n1} \dot{\epsilon}^{m1} \exp(-B1/T) \tag{3}$$

where A1, n1, m1 and B1 are constants for that alloy. L0 is given by $$L0 = L00 + A0\, t^{n0} \exp(-B0/T) \tag{4}$$

where A0, n0 and B0 are constants for the same alloy.

The constants A0, n0, a, b, B0, A1, n1, m1, B1, A2, n2, and B2 are obtained from the experimental data and a curve fitting technique, e.g., stepwise multiple regression analysis. Prior to conducting the experiments to determine the various constants of these equations, the only property of the material which is known is the initial beta phase grain size (L00).

The initial beta phase grain size for a given specimen can be determined by sectioning the specimen, mounting the section and having it polished and etched. The etched surface is then examined under an optical metallograph at 500× to 1000× magnification. By examination and measurement of photomicrographs of the specimen, the alpha-beta volume fractions, alpha grain size, beta size (or means free distance), contiguity of alpha, and aspect ratio ca be determined.

The beta grain size, considered the mean free distance between alpha grains in the longitudinal direction in a given specimen, may also be referred to as L00 for the initial beta grain size, L0 for beta grain size prior to forming but after heat-up and soaking, and L for instantaneous beta grain size.

$$L00_{(average)} = \frac{L00_{(long.)} + L00_{(trans.)}}{2}$$

$$L0_{(average)} = \frac{L0_{(long.)} + L0_{(trans.)}}{2}$$

$$L_{(average)} = \frac{L_{(long.)} + L_{(trans.)}}{2}$$

The values of L and L0, however, can be developed from the measured L00 via Equations (3) and (4).

The experimental data to determine the constants for equations (2), (3) and (4) can be developed from various tests performed on exemplary specimens of a given alloy representing the material to be formed into parts. These tests are organized into three categories. Each category involves three variables, and the tests are conducted for three levels of each variable: high, medium and low levels. Thus, the number of tests in each category is 27 ($3^3$). The three categories of tests performed in order to develop the constants for the above equations are: (1) static microstructural change tests; (2) high temperature uniaxial tension tests; and (3) high temperature biaxial cone tests. The variables in the static microstructural change tests are: temperature, time at temperature, and cooling rate. The variables in the high temperature uniaxial tension tests are: strain, strain rate, and temperature. The variables in the high temperature biaxial cone tests are: forming temperature, forming pressure, and forming time. As noted above, tests are conducted at three levels of each of the various variables for microstructure evaluation.

In the performance of the biaxial cone tests, specimens are actually formed into a plurality of cones under controlled conditions. The analysis of data derived from the various tests indicates that the beta grain size of the material continually increases with an increase in the temperature, the time at temperature, and the strain rate. Also the increase in the grain size in the longitudinal direction is greater than that in the transverse direction. The actual data from the various tests performed on a given specimen correlate very closely with the values predicted for the specimen from the generalized equation (2), (3) and (4) above. Thus, the analysis by which these equations are developed is verified and the equations are considered valid for use in the superplastic and superplastic/diffusion bond forming of titanium alloy parts. A corresponding approach may be utilized in developing corresponding equations for use with the superplastic forming of other materials.

BRIEF DESCRIPTION OF THE DRAWING

A better understanding of the present invention may be had from a consideration of the following detailed description, taken in conjunction with the accompanying drawing in which.

DESCRIPTION OF THE PREFERRED EMBODIMENT

Figure 1:
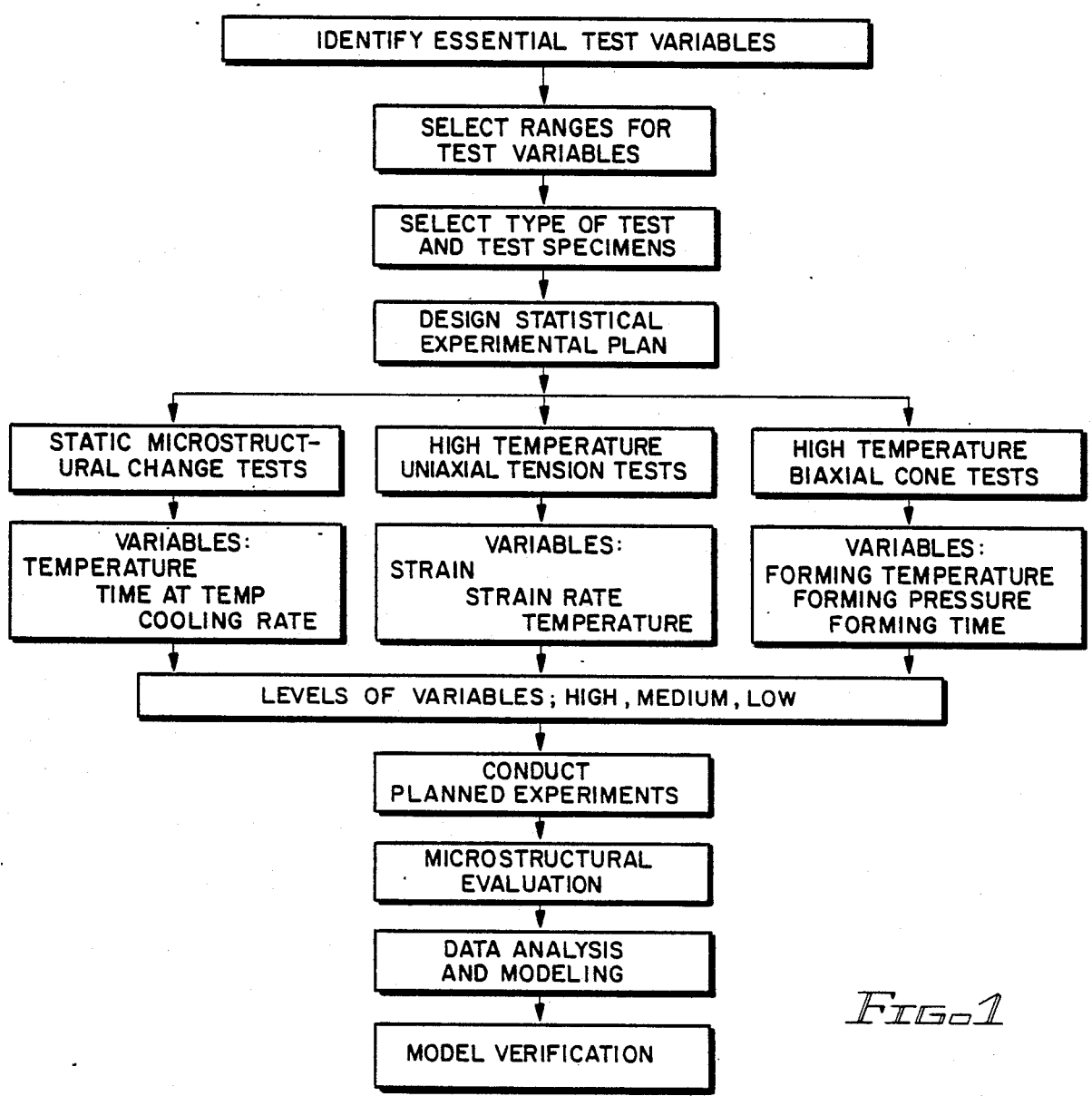
FIG. 1 is a block diagram showing the preferred method of the present invention.

FIG. 1 is a schematic block diagram illustrating a generalized method in accordance with the present invention for designing a series of experiments, directed to one specific application of the method described herein, in a systematic approach to analytical research wherein by the judicious selection of particular experiments, specimens and parameters the researcher is enabled to derive a maximum amount of information from a minimum number of experiments to be performed, based on a selected model of the variables involved. Thus, in accordance with this invention, the first step is to identify the essential test variables to which the experiments are to be directed. Thereafter, the ranges for the test variables, the types of tests, and the specimens on which the tests are to be conducted are selected. Using these ranges, a statistical experimental program is designed. The selected types of tests are then performed, using selected combinations of the respective variables in a manner which minimizes the actual number of tests that must be conducted in order to develop the essential information from the experiments. The data derived from these tests are analyzed by suitable methods of statistical analysis and curve-fitting, and statistically meaningful mathematical models are developed using these techniques. These models are then verified by comparing actual test data with the data predicted using these models.

In one specific application of the method of the invention, the method is used for validating the control equations used for superplastic forming under optimum conditions consistent with the desired properties in the finished part. This method involves the initial steps of selecting the range of values of the variables which are to be used in testing material samples and selecting the specimens for testing.

The most widely used alloys which can be superplastically formed into aircraft structures are alpha-beta titanium alloys. The alloys selected for testing, as described herein, are Ti-6Al-4V (material A) and Ti-6Al-6V-2Sn (materials B and C). Ti-6Al-4V is the principal titanium alloy used for aircraft structures. Regular grade normal texture Ti-6-Al-4V was selected to serve as the base alloy for developing a comprehensive metallurgical understanding of superplastic forming in alpha-beta titanium alloys. The beta-transus temperature of Ti-6Al-4V regular grade is reported to be 1275° K. (1836° F.).

Ti-6Al-6V-2Sn, an alpha-beta alloy, was selected because its beta-transus temperature, 1214° K. (1725° F.), is appreciably lower than the regular grade Ti-6Al-4V. The two lots of this alloy (materials B and C) were procured from different material sources and were tested in order to give a measure of the variations from one lot to another.

Table I lists the chemical composition, in weight percent, of the three different material lots of titanium alloys which were tested in accordance with the method of the present invention.

TABLE I
CHEMICAL COMPOSITIONS OF TITANIUM ALLOYS

| | Chemical Composition, Weight Percent | | | | | | | |
|---|---|---|---|---|---|---|---|---|
| | Al | V | Sn | Fe | O | N | C | H | Cu |
| Material A | 6.28 | 4.12 | — | 0.16 | 0.142 | 0.0067 | 0.023 | 0.0123 | — |
| Material B | 5.58 | 5.46 | 1.97 | 0.48 | 0.164 | 0.0106 | 0.022 | 0.0049 | 0.52 |
| Material C | 5.64 | 5.53 | 1.92 | 0.51 | 0.151 | 0.0059 | 0.020 | 0.0036 | 0.54 |

The balance of the alloy material is titanium.

The tests which are conducted in accordance with the method of the invention are: static microstructural change tests, high temperature uniaxial tests, and high temperature biaxial cone tests. Each of the three categories of tests involves testing under three variables. The tests are run for three different levels of each variable. Thus, each test category involves conducting $3^3$ or 27 separate tests.

For the static microstructural change test category, the variables are: temperature, time at temperature, and cooling rate. Tables II and III set forth the different levels of the three variables involved in particular static microstructural change tests which were performed on materials A, B and C.

TABLE II
STATIC MICROSTRUCTURAL CHANGE TESTS FOR MATERIAL A

| | Level of the Variables | | |
|---|---|---|---|
| Variables | High | Medium | Low |
| Temperature | 1200° K. (1700° F.) | 1158° K. (1625° F.) | 1116° K. (1550° F.) |
| Time at Temperature | 5 Hours | 3 Hours | 1 Hour |
| Cooling Rate | Water Quench | Air Cool | Furnace Cool |

TABLE III
STATIC MICROSTRUCTURAL CHANGE TESTS FOR MATERIALS B and C

| | Material Levels of the Variables Material | | | | | |
|---|---|---|---|---|---|---|
| | B | | | C | | |
| Variables | High | Medium | Low | High | Medium | Low |
| Temperature | 1144° K. (1600° F.) | 1102° K. (1525° F.) | 1061° K. (1450° F.) | 1172° K. (1650° F.) | 1144° K. (1600° F.) | 1116° K. (1550° F.) |
| Time at Temp. | 5 Hours | 3 Hours | 1 Hour | 5 Hours | 3 Hours | 1 Hour |
| Cooling Rate | Water Quench | Air Cool | Furnace Cool | Water Quench | Air Cool | Furnace Cool |

For a better understanding of the static microstructural change tests, it may be helpful to explain the microstructural parameters which are involved. The microstructural features important for superplasticity include grain size, grain shape, contiguity of alpha phase and phase distribution. These parameters and the manner in which they change during the SPF processes are briefly described in the following paragraphs.

Grain size has the most pronounced effect on superplasticity of the alloys. For titanium alloys, superplastic behavior is usually observed for the material having grain size less than 10 microns. The enhance superplasticity, smaller grain sizes are desired because the flow stress decreases and the strain rate sensitivity of the flow stress increases with the decrease in the grain size. At any given applied stress in the superplastic region, a smaller grain size results in an increased strain rate ($\epsilon$) because of the increased contribution to total strain from grain boundary sliding. Also, for a given strain rate and temperature, the flow stress ($\sigma$) of the material decreases with the decrease in the grain size. Mathematically, it can be expressed as $$\dot\epsilon \, \alpha_L \frac{1}{b} \tag{5}$$

$$\sigma \, \alpha \, L^a \tag{6}$$

where L is the grain size and a and b are constants.

Figure 2:
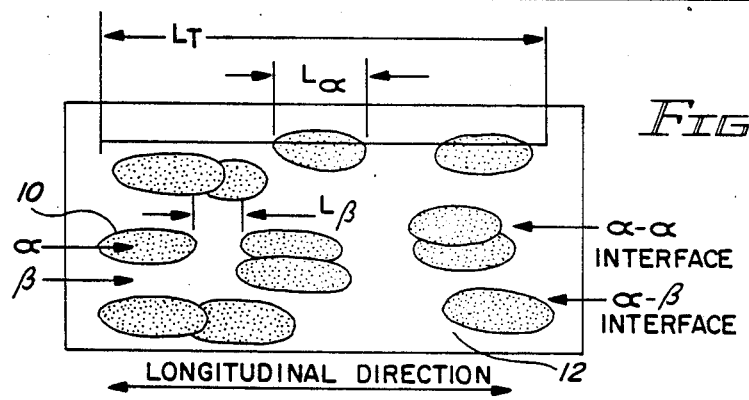
FIG. 2 is a sketch reproducing a portion of a photomicrograph of a material specimen, showing grain size and relationships.

For purposes of the present invention, the term "grain size" needs to be clearly understood, since it is not precisely defined in published literature on the subject. In the literature, it is usually not clear whether the grain size represents mean intercept length in two dimensions, in three dimensions, or the grain diameter, and whether or not it is of alpha phase only, beta phase only, or an average. For present purposes, the grain size is defined as a mean intercept length in the three dimensional space for alpha phase or a mean free distance ($L_\beta$) for beta phase, as indicated in FIG. 2. Existing data from all sources indicate that the grain size increases with the increase in the temperature and the time at temperature. Most of the increase in flow stress during the process is attributed to grain growth. Some data indicate an additional increment of grain growth due to strain and strain rate.

Equiaxed alpha grains are considered necessary for superplasticity. There is some evidence of elongation of alpha grains in the direction of strain during SPF.

The coalescence of and the relative spacing between alpha particles and the uniformity of this spacing have been found to be important for superplasticity. There is some qualitative evidence that alpha grains tend to move toward one another as strain increases.

Early research on superplasticity indicated the requirement for superplasticity of a two-phase microstructure with approximately equal amounts of phases of similar deformation characteristics. A large number of interphase boundaries is beneficial for retarding grain growth. Recent investigations have shown that superplasticity can be conferred on fine-grained single-phase alloys by incorporating stable second-phase dispersoids to retard grain growth. Superplasticity is significantly affected by the nature of sliding boundaries. When grains of the same phase slide, local hardening in the heavily-strained boundary regions is relieved by grain boundary migration, which creates new strain-free material in which sliding can continue. Hardened regions created by sliding at interfaces between chemically dissimilar phases cannot be relieved by simple grain boundary migration without redistribution of the solute atoms.

According to classical grain-growth kinetic theory, the increase in the grain size of a material when exposed to elevated temperature for a certain length of time can be considered as a thermally activated process, and can be represented by the following:

$$L - L0 = At^n \tag{7}$$

$$A = A0 \exp\left(-\frac{Q}{kT}\right) \tag{8}$$

$$L - L0 = A0\, t^n \exp\left(-\frac{Q}{kT}\right) \tag{9}$$

where:
L0 is initial grain size
L is final grain size
A is the activation energy
t is time at temperature
T is temperature
Q is empirical activation energy
k is Boltzman's constant
A0 and n are constants.

Equation (9) is taken as the model for the static grain growth.

The final beta grain size values measured in the longitudinal and the transverse directions for each test condition for selected specimens are used to determine the corresponding grain growth ($\Delta L$) values. Since $\Delta L = L - L0$, Equation (9) can be rewritten as:

$$\Delta L = A0\, t^n \exp\left(-\frac{Q}{kT}\right)$$

Taking logarithms of both sides of Equation (10), we get $$\ln(\Delta L) = B0 + n \ln(t) - B/T$$

where B0 and B are constants.

In order to get a statistically meaningful model, a stepwise multiple regression analysis is conducted using a commercially available computer software program (obtainable from Statistical Analysis Systems, Inc. of Cary, N.C.) with the independent variables as ln (t) and 1/T and the dependent variable as $\Delta L$.

This regression analysis procedure uses the maximum $R^2$ improvement technique. It begins by finding the one variable model producing the highest $R^2$. Then another variable, the one that would yield the greatest increase in $R^2$, is added. Once the two-variable model is obtained, each of the variables in the model is compared to each variable not in the model. For each comparison, this technique determines if removing one variable and replacing it with the other variable would increase $R^2$. After comparing all possible switches, the interchange that produces the largest increase in $R^2$ is made.

Comparisons begin again, and the process continues until no switch could increase $R^2$. The two-variable model thus achieved is considered the "best possible" two-variable model the technique can find. Another variable is then added to the model, and the comparing-and-switching process is repeated to find the "best possible" three-variable model, and so forth. This stepwise multiple regression analysis is performed with data from each of the different types of tests performed in the practice of the invention in order to develop the "best possible" model from which the constants for the generalized control Equations (2), (3) and (4) are derived.

Static ($\epsilon = 0$) microstructural change tests are the tests where small samples of sheets are heated to various temperatures for different lengths of time and then water quenched, air cooled or furnace cooled. The samples are then examined for their microstructures to determine the effects of heating temperature, heating time and rate of cooling on the microstructural changes, including grain growth and alpha-beta phase distribution.

The optimum values of the three levels of heating temperature, heating time and cooling rate variables for materials A, B, C are selected from published literature data and are set forth in Tables II and III above. All of the static microstructural change tests were performed using a furnace in which the temperature was maintained within ±6° K. (±10° F.) of the set point. The various specimens of each material type (A, B and C) were then sectioned and evaluated for their microstructures in the longitudinal and transverse directions.

FIG. 2 is a sketch representing a portion of a photomicrograph of a titanium alloy section showing the relationship of the alpha and beta phases. In FIG. 2, the alpha phase grains 10 are represented as oblate ellipsoids in a beta phase matrix 12. There is an alpha-beta interface about the periphery of an alpha phase grain 10 and, where two alpha phase grains touch or overlap, there is an alpha-alpha interface.

The photomicrograph of each specimen, corresponding generally to FIG. 2, was analyzed in the longitudinal and transverse directions in order to determine alpha-beta volume fractions, alpha grain size, beta grain size, contiguity of alpha, and aspect ratio. Such measurements are made using known linear intercept and manual point-count techniques. This involves the use of a transparent grid (6 cm×6 cm) containing one millimeter square divisions, the grid being laid on the photomicrograph so that one side of the grid is parallel to the longitudinal direction of the specimen microphotograph. It is thus possible to determine the parameters listed above. In FIG. 2, the following definitions apply:

$L_t$ = total length of a grid line
$L_\beta$ = grain size of beta phase (corresponds to mean free distance between alpha phases)
$L_\alpha$ = grain size of alpha phase The beta grain size, $L_\beta$, may also be referred to as L00 for the initial beta grain size, L0 for beta grain size prior to forming but after heat-up and soaking, and L for instantaneous beta grain size.

$$L00_{(average)} = \frac{L00_{(long.)} + L00_{(trans.)}}{2}$$

$$L0_{(average)} = \frac{L0_{(long.)} + L0_{(trans.)}}{2}$$

$$L_{(average)} = \frac{L_{(long.)} + L_{(trans.)}}{2}$$

The mean grain size of alpha phase is developed from the alpha phase volume fraction and the manual point-count results.

Figure 3:
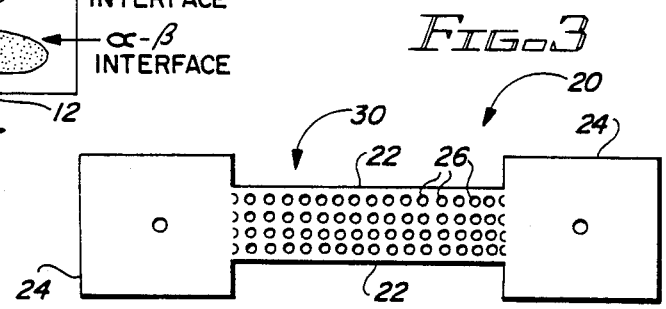
FIG. 3 is a sketch of a particular specimen prepared for testing.

For the uniaxial tension tests, specimens were prepared in the form shown in FIG. 3. Each specimen 20 has opposite parallel sides 22 in the central section, which has a reduced width relative to the end clamping sections 24. Circular grids 26, 3.2 mm (0.125 inch) in diameter, are electrochemically etched onto a surface of the central gage 30 in order to permit accurate measurement of strain levels and strain uniformity along the gage length of the specimens.

The tension tests were performed at desired constant strain rates ($\dot{\epsilon}$) and at desired temperature (T) using a closed-loop, hydraulically actuated 50 Kip test machine manufactured by Materials Test Systems Corporation of Minneapolis, Minn. (MTS Model 810). The actuator movement was controlled by an Automated Multiuser System which was programmed to increase the rate of movement of the crosshead continuously along with the gage length to keep the ratio of the crosshead speed to the gage length constant. The specimen elongation was measured by the stroke LVDT. The specimens were cleaned prior to the high temperature testing to remove any oil or moisture. A three-zone Applied Test System Resistance Furnace was used for heating the load train which was inside an Inconel tube. For each test, the temperature near the specimen was continuously measured, controlled and recorded for the entire duration of the test. Variation of temperature along the gage length of the specimen was not more than 6° K. (10° F.). During testing, the temperature of the specimen was controlled within ±3° K. (±5° F.) of the desired set point. To prevent oxidation, all the tests were conducted in a static argon atmosphere with slight positive pressure. Load-time data were obtained digitally using an automatic data acquisition system. The room temperature gage length of the specimen, 50.8 mm (2 inch), was corrected to include any increase due to thermal expansion at elevated temperatures.

The computer stopped the crosshead movement once the desired strain was reached. The load-train was then disconnected and argon gas flow rate increased to simulate air quenching. The strain values obtained by the automatic data acquisition system were confirmed by the grid measurement. A specimen was cut from the gage length of each specimen and evaluated for microstructure. The microstructure was then modeled as a function of temperature, strain and strain rate (hence time at temperature).

The batches of material from which the test specimens were selected were systematically characterized to determine their room temperature mechanical properties, as-received microstructure, texture and chemistry. Room temperature uniaxial tension tests were performed on specimens prepared as indicated in FIG. 3. Such specimens were pulled to failure in uniaxial tension with strain rates of $10^{-3}$ per second, $2 \times 10^{-4}$ per second, and $5 \times 10^{-5}$ per second, using the 50 Kip test machine mentioned previously. Specimen elongation was recorded using a Specimen elongation was recorded using a 2-inch extensometer and stress-strain data was developed for each specimen thus tested.

The levels of the variables utilized in the high temperature uniaxial tension tests are shown in the following tables IV, V and VI.

TABLE IV

HIGH TEMPERATURE UNIAXIAL TENSION TESTS
MATERIAL A

| Variables | Levels of Variables | | |
|---|---|---|---|
|  | High | Medium | Low |
| Temperature | 1200° K. | 1158° K. | 1116° K. |
|  | (1700° F.) | (1625° F.) | (1550° F.) |
| Strain Rate | $10^{-3}$/sec | $2 \times 10^{-4}$/sec | $5 \times 10^{-5}$/sec |
| True Strain | 1.8 | 1.2 | 0.6 |
| Engineering Strain | 505% | 232% | 82% |

TABLE V

HIGH TEMPERATURE UNIAXIAL TENSION TESTS
MATERIAL B

| Variables | Levels of Variables | | |
|---|---|---|---|
|  | High | Medium | Low |
| Temperature | 1144° K. | 1102° K. | 1061° K. |
|  | (1600° F.) | (1525° F.) | (1450° F.) |
| Strain Rate | $10^{-3}$/sec | $2 \times 10^{-4}$/sec | $5 \times 10^{-5}$/sec |
| True Strain | 1.8 | 1.2 | 0.6 |
| Engineering Strain | 505% | 232% | 82% |

TABLE VI

HIGH TEMPERATURE UNIAXIAL TENSION TESTS
MATERIAL C

| Variables | Levels of Variables | | |
|---|---|---|---|
|  | High | Medium | Low |
| Temperature | 1172° K. | 1144° K. | 1116° K. |
|  | (1650° F.) | (1600° F.) | (1550° F.) |
| Strain Rate | $10^{-3}$/sec | $2 \times 10^{-4}$/sec | $5 \times 10^{-5}$/sec |
| True Strain | 1.8 | 1.2 | 0.6 |
| Engineering Strain | 505% | 232% | 82% |

The biaxial cone tests have been developed to simulate the actual superplastic forming of sheet metal parts. This test permits constant stress and constant strain rate with varying amounts of strain along the depth of the cone. Optimum values of three levels for the selected variables—temperature, pressure and test duration—have been selected from published literature data and are set forth in the following Table VII for material A and in Table VIII for materials B and C.

TABLE VII

HIGH TEMPERATURE BIAXIAL CONE TESTS MATERIAL A

| Variables | Levels of Variables | | |
|---|---|---|---|
| | High | Medium | Low |
| Temperature | 1200° K. (1700° F.) | 1158° K. (1625° F.) | 1116° K. (1550° F.) |
| Pressure | 1379.0 KPa (200 psi) | 689.5 KPa (100 psi) | 344.8 KPa (50 psi) |
| Test Duration | 5 Hours | 3 Hours | 1 Hour |

TABLE VIII

HIGH TEMPERATURE BIAXIAL CONE TESTS MATERIALS B and C

| Variables | Levels of Variables | | | | | |
|---|---|---|---|---|---|---|
| | Material B | | | Material C | | |
| | High | Medium | Low | High | Medium | Low |
| Temp. | 1144° K. (1600° F.) | 1102° K. (1525° F.) | 1061° K. (1450° F.) | 1172° K. (1650° F.) | 1144° K. (1600° F.) | 1116° K. (1550° F.) |
| Pressure | 1379.0 KPa (200 psi) | 689.5 KPa (100 psi) | 275.8 KPa (40 psi) | 1379.0 KPa (200 psi) | 689.5 KPa (100 psi) | 275.8 KPa (40 psi) |
| Test Duration | 5 Hours | 3 Hours | 1 Hour | 5 Hours | 3 Hours | 1 Hour |

In these tests, test duration begins when the temperature and pressure reach the desired values.

The biaxial cone tests were conducted on individual panels, 7 inches square, which were machined from sheets of the batch material. Circular grids with ⅛ inch circles were electrochemically etched onto one surface of each panel. A conical die with a cone angle of 57° was used for this test. Each die formed four cones. During the test, the titanium sheet panel was clamped between the dies, and the assembly was heated to the test temperature. Argon gas was then used to pressurize the die cavity at the rate of 20 psi per minute. The constant argon gas pressure caused cones to be formed under four different constant stress values and at four different constant strain rates.

Figure 4:
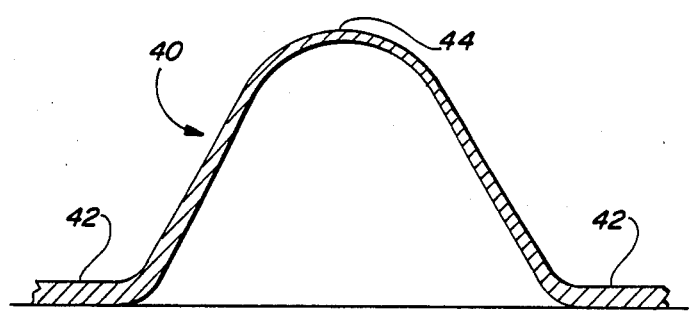
FIG. 4 is a sectional view of a portion of a specimen deformed by superplastic forming.

A section of one such cone, formed by the method described, is shown in FIG. 4. In this figure, the sectioned formed cone 40 is shown extending upwardly from adjacent portions of the sheet panel 42. It will be noted that the wall thickness is reduced progressively from the sheet portions 42 to the apex 44 of the cone 40.

Each cone on a test panel has varying strain values along the depth of the cone. Accurate measurement of the strain levels and the strain variations as a function of cone depth may be made by measuring the thickness of the cone walls and by taking measurements from the deformed circular grid marks on the cone surface. Strain values measured using the circular grids along with the different test durations provide data for the plotting of strain ($\epsilon$) versus time (t). The slope of the plotted curve ($d\epsilon/dt$) at any time value is a measure of the instantaneous strain rate ($\dot\epsilon$) prevailing at that instant. In addition to the cone measurements, the cones are also evaluated for their microstructure.

The results of the static microstructural change tests indicate that the alpha and beta grain sizes increase continuously as a function of time for a given temperature. This increase is greater at higher temperature than at lower temperature. The beta grain size tends to grow faster than the alpha grain size at higher temperatures but the rate of growth is less at the lower temperatures. The alpha grain size for a given temperature and time at temperature was the smallest for the water quenched specimens and the largest for the furnace cooled specimens. The beta grain size, however, was the largest for the water quenched specimens and was smallest for the furnace cooled specimens. The volume fraction of alpha phase decreased with the increase in the temperature and the time at temperature; it was largest for the furnace cooled specimens and least for the water quenched specimens.

Figure 5:
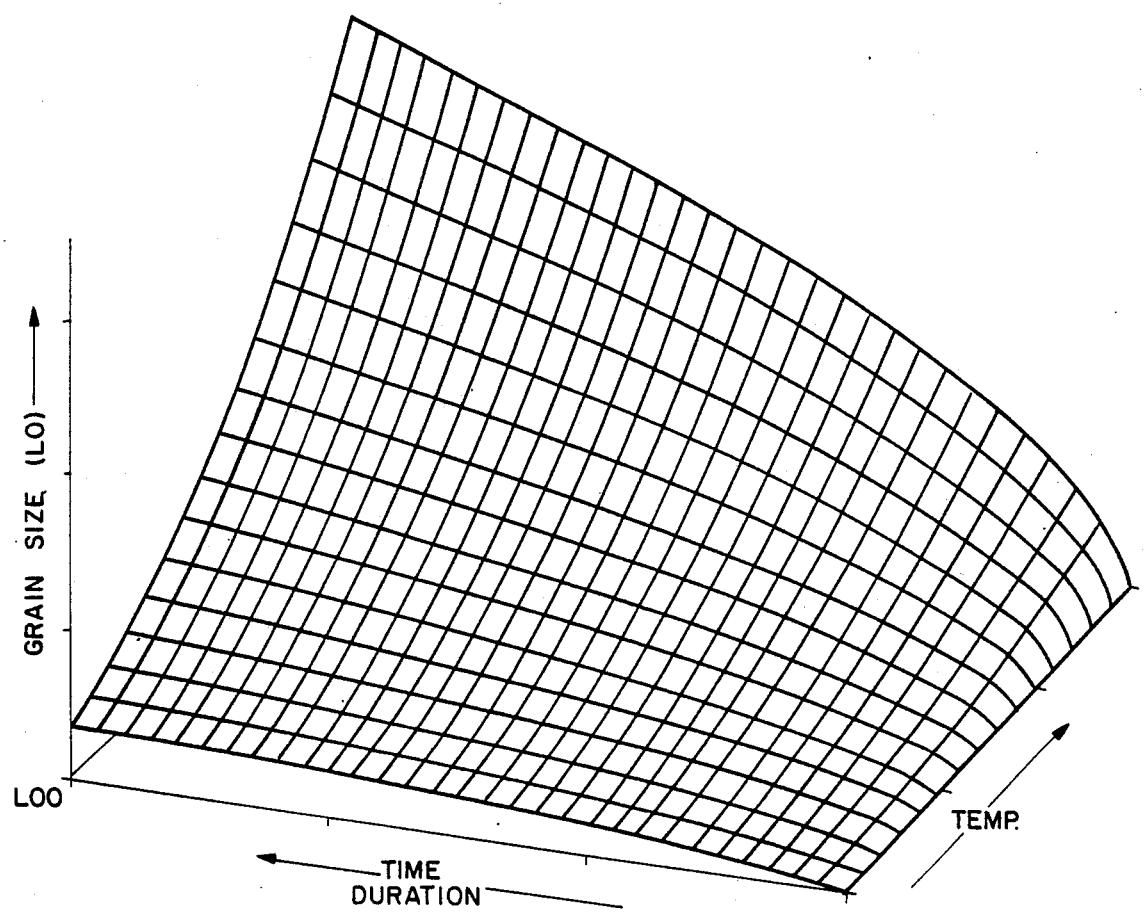
FIG. 5 is a three-dimensional plot of grain size (L0) just prior to forming as a function of heat-up and soak temperature and time at temperature showing static grain growth of one of the materials tested.

A plot of the results of the static microstructural change tests showing the static longitudinal grain growth model for material A in accordance with Equation (3) with strain rate ($\dot\epsilon$) equal to zero is shown in FIG. 5. This shows the variation in grain size as a function of time duration and temperature, with the variables increasing in the direction of the arrows. The corresponding plot of static grain growth in the transverse direction is closely similar to FIG. 5, as are the corresponding plots for materials B and C.

The results of the high temperature uniaxial tension tests indicate that the flow stress of each material increased with decreasing temperature and strain rate. For a given test temperature, the flow stress increased with strain, indicating hardening under stress. This hardening increased with the increase in the test temperature and the strain level, while it decreased with the increase in the strain rate. The hardening was attributed to the static and dynamic grain growth. Both alpha and beta grain sizes increased continuously under these tests as a function of strain for a given strain rate and temperature. The increase in grain size was greater for the higher temperature than for the lower temperature, but was less for the higher strain rate than for the lower strain rate. The volume fraction of alpha phase decreased with the increase in the temperature and the time at temperature.

The variables affecting grain growth can be related in an equation of the form of Equation (2) above, namely:

$$\dot\epsilon = \frac{A2\ \sigma^{n2}}{L^a\ T^b} \exp(-B2/T) \quad (2)$$

where L is instantaneous beta grain size and a, b, n2, A2 and B2 are constants.

The final beta grain size values measured in the longitudinal and the transverse directions for each tensile test condition for materials A and B are used to determine the corresponding dynamic grain growth ($\Delta L$) values, according to the following modification of equation (3):

$$\Delta L = L - L0 = A1 t^{n1} \dot\epsilon^{m1} \exp(-B1/T) \quad (2a)$$

Taking logarithms of both sides of Equation (3a) yields:

$$\ln(\Delta L) = A + n1 \ln(t) + M1 \ln(\dot\epsilon) - B1/T \quad (12)$$

Figure 6:
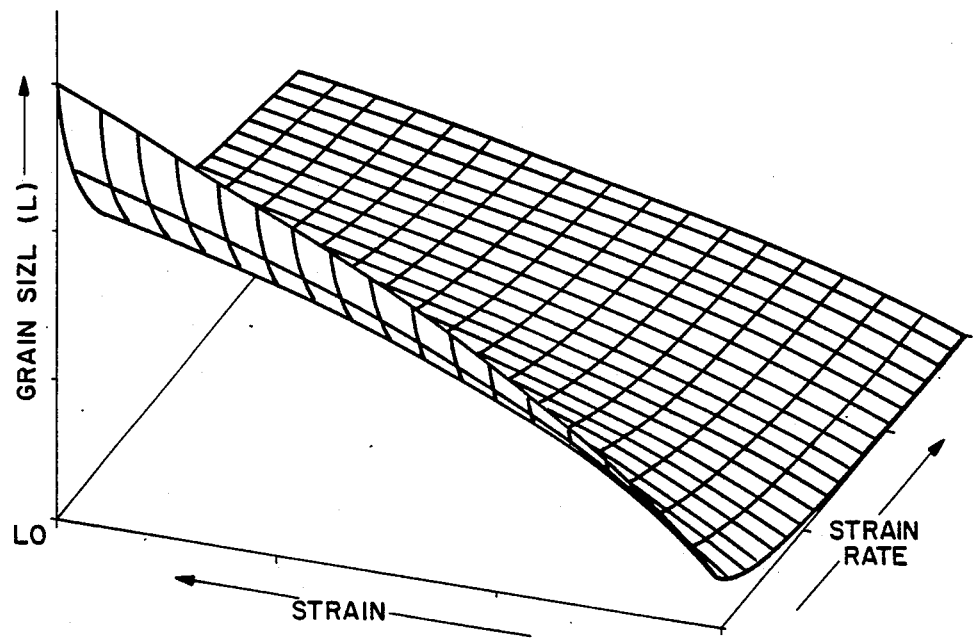
FIG. 6 is a three-dimensional plot of instantaneous beta grain size (L) as a function of strain and strain rate at constant temperature, showing dynamic longitudinal grain growth for one of the material specimens tested.

In order to develop a statistically meaningful model, a stepwise multiple regression analysis was conducted using the Statistical Analysis Systems software, in the manner described above, with the independent variables as ln (t), ln ($\dot{\epsilon}$) and 1/T, and the dependent variable as ln ($\Delta$L). The "best possible" statistical model developed in accordance with this statistical analysis for material A is represented in FIG. 6. This represents the dynamic longitudinal grain growth model for material A, showing the relationship of grain size to strain and strain rate at constant temperature. The corresponding plot of data for dynamic grain growth in the transverse direction for material A is very similar to FIG. 6, as are the corresponding plots for the other materials.

Figure 7:
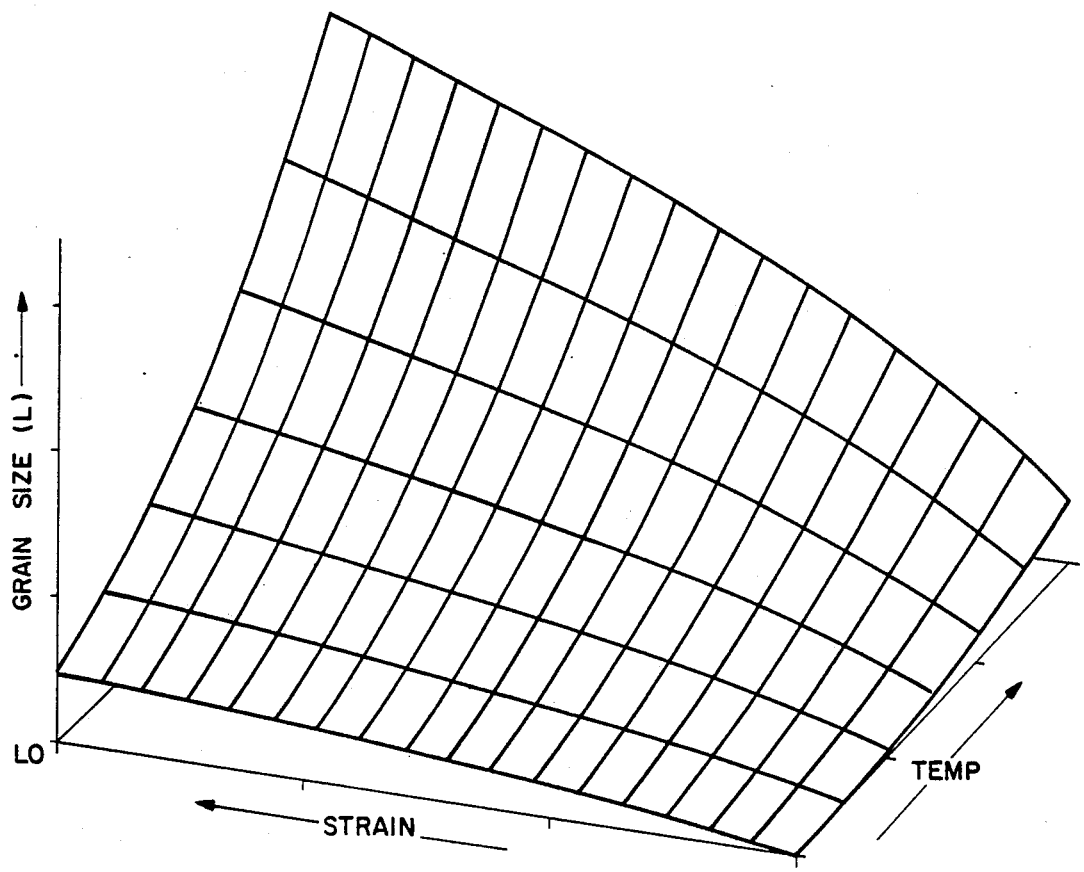
FIG. 7 is a three-dimensional plot of instantaneous beta grain size (L) as a function of strain and temperature at constant strain rate, showing dynamic longitudinal grain growth for the material specimen corresponding to FIG. 6.

FIG. 7 is a three-dimensional plot of dynamic longitudinal grain growth for material A developed in the same manner and shows the relationship of grain size to strain and temperature when strain rate is held constant. Corresponding plots of dynamic grain growth in the transverse direction for material A and dynamic grain growth for materials B and C at constant strain rate are similar in configuration.

For the high temperature biaxial cone tests, maximum strain at the apex of the largest cone for each test condition was calculated from the measured values of initial thickness and final thickness at the cone apex. Average strain rate was developed by dividing maximum strain by test duration time. Constant stress prevailing during deformation was calculated from measurements of radius at the base of the cone, initial thickness of the sheet, applied gas pressure, and a numerical constant related to the cone angle of 57°.

The generalized control Equation (4) is based on a modeling of the static grain size of the material as a function of the test variables. This grain size model is then used to predict the instantaneous grain size as a function of the deformation, Equation (3). The instantaneous grain size for continuous deformation in conjunction with the other test variables is then used to model the superplastic deformation characteristics (Equation 2). The tests show that beta phase is much softer than the alpha phase at elevated temperatures. Thus, the beta phase is likely to deform more easily than the alpha phase, suggesting that beta phase is controlling in determining the rate of deformation. Accordingly, grain growth characteristics of the beta phase are used to develop the generalized control equation for superplastic deformation.

Equation (3), which defines the dynamic grain growth model, indicates the tensile deformation as a function of the temperature, the time at temperature and strain rate. However, because the specimen continuously deforms at a given strain rate, the time required to reach a certain strain value depends upon the strain rate at which the specimen deforms. Thus, strain rate is taken into account in developing the model for dynamic grain growth occurring during superplastic formation, defined by Equation (3), from which the instantaneous beta phase grain size (L) in generalized control Equation (2) is developed.

The flow stress values obtained as a function of strain, strain rate and temperature are used to model superplastic flow behavior. Repeating Equation (3), the instantaneous beta grain size L can be expressed as:

$$L = L0 + A1 t^{n1} \epsilon^{m1} \exp(-B1/T) \quad (3)$$

It will be noted that L0, the initial beta grain size prior to initiation of forming, is not the initial beta grain size of the as-received material but it is the grain size after the soaking. It incorporates the grain growth occurring during soaking. In other words, L0 is the final beta grain size obtained using the static grain growth model, as expressed above in Equation (4).

The instantaneous beta grain sizes developed from Equation (3) as a function of deformation are used to obtain the superplastic deformation model of the form of Equation (2).

$$\dot{\epsilon} = \frac{A2 \, \sigma^{n2}}{L^a \, T^b} \exp(-B2/T) \quad (2)$$

Taking logarithms of both sides of this equation yields:

$$\ln(\dot{\epsilon}) = A + n2 \ln(\sigma) - a \ln(L) - b \ln(T) - B2/T \quad (13)$$

In order to get a statistically meaningful model, the stepwise multiple regression analysis using the Statistical Analysis Systems software is conducted, in the manner described above, with the independent variables being ln ($\sigma$), ln (L), ln (T) and 1/T, and the dependent variable being ln ($\dot{\epsilon}$). The "best possible" statistical models developed by using this analysis for material A are plotted in FIGS. 8 and 9.

Figure 8:
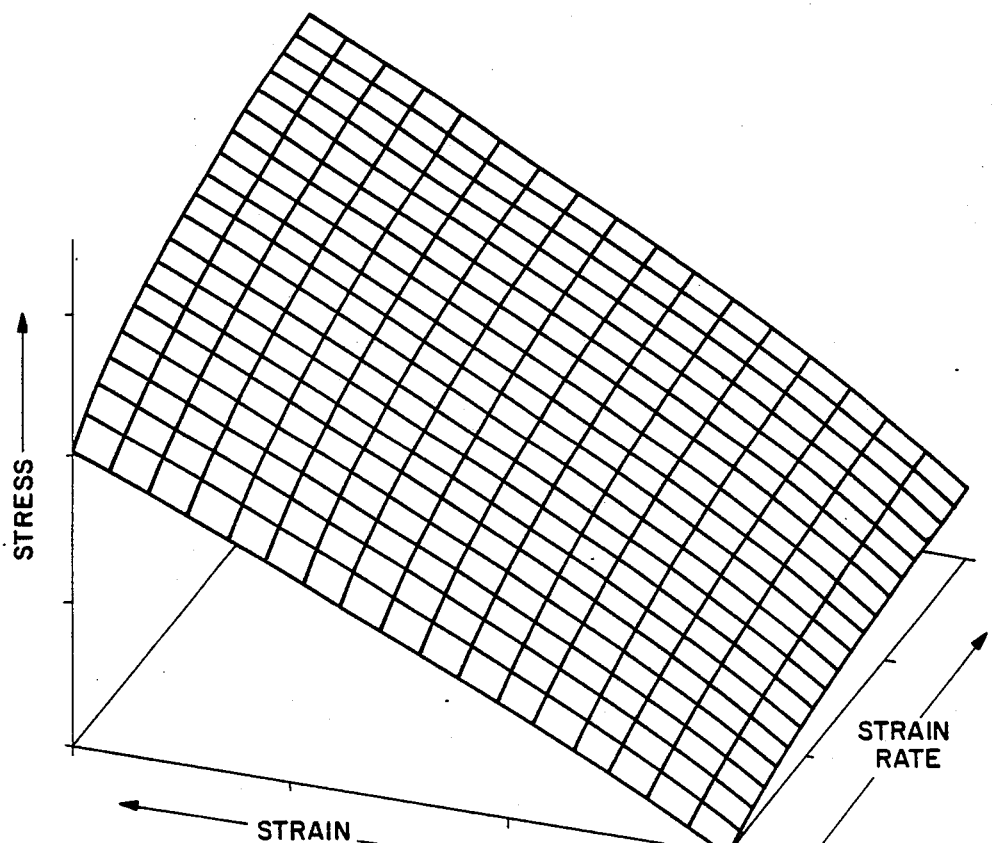
FIG. 8 is a three-dimensional plot of stress as a function of strain and strain rate at constant temperature for one of the material specimens tested.

FIG. 8 is a three-dimensional plot of stress as a function of strain and strain rate at one constant test temperature. This generally represents the superplastic deformation model for material A at the other temperatures tested.

Figure 9:
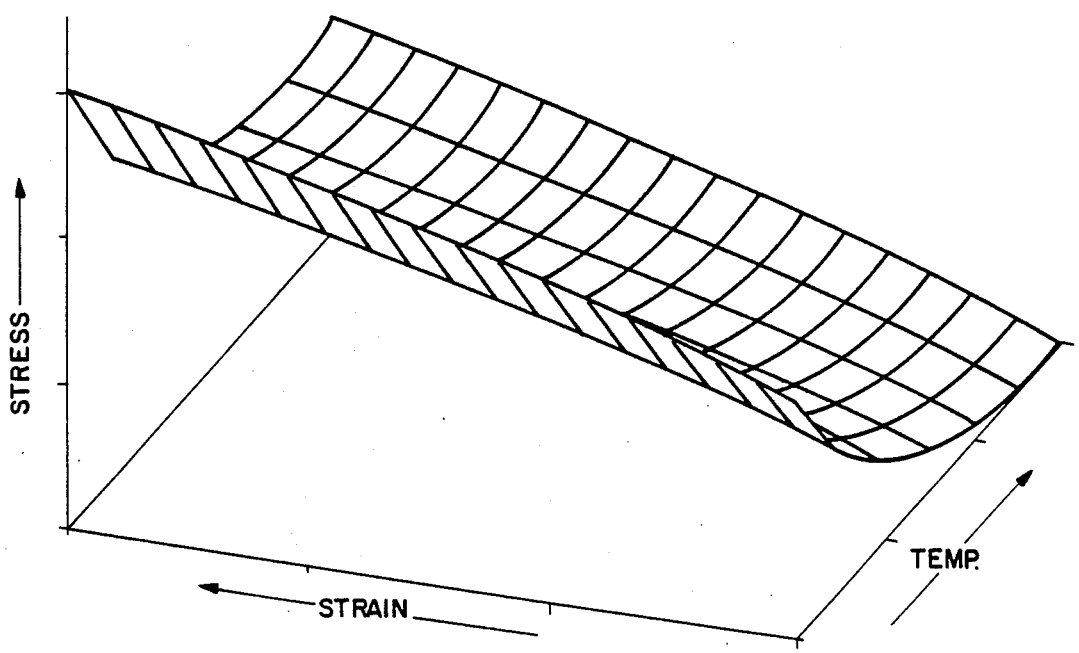
FIG. 9 is a three-dimensional slot of stress as a function of strain and temperature at constant strain rate for the specimen corresponding to FIG. 8.

The three-dimensional plot of stress as a function of strain and temperature at one constant strain rate for material A is shown in FIG. 9. Similar plots exist for materials B and C.

As can be seen from these figures, the flow stress of the material increases with decreases in temperature and strain rate. For a given test temperature, the flow stress increases with strain, producing hardening. This hardening is induced by the grain growth and increases with the increase in test temperature and the strain level, while it decreases with the increase in strain rate.

For a given strain rate and at low strain levels, the flow stress of the material deforming at higher temperature is lower than the flow stress of the material deforming at lower temperatures. However, as deformation proceeds (strain or time at temperature increasing), the grain size of the material deforming at higher temperature increases more rapidly than the grain size of the material deforming at lower temperature. This higher grain growth at higher temperature causes flow stress to increase more rapidly. After sustained strain levels (long times at temperature), the flow stress of the material deforming at high temperature becomes equal to or greater than the flow stress of the material deforming at lower temperature.

Similarly, at constant temperature (plot of FIG. 8) the specimen deforming at a lower strain rate takes a longer time to reach the desired strain than the specimen deforming at a higher strain rate. The flow stress of the specimen deforming at a higher strain rate is higher at low strain levels than that of the specimen deforming at a lower strain rate. However, the specimen deforming at a lower strain rate takes a longer time to reach a desired strain level than the specimen deforming at a higher strain rate. This causes a higher rate of grain growth and hence, the flow stress for the specimen deforming at lower strain rate increases. After large strain levels (long times at temperature), the flow stress of the material deforming at a lower strain rate becomes equal to or greater than the flow stress of the material deforming at a high strain rate.

The various test procedures utilized in the practice of the method of the present invention serve to provide the data from which the values of the various constants in Equations (2), (3), and (4) are developed. Specifically, the constants for these equations are derived from data developed from tests of specimens taken from material lots to be formed in production processes, using stepwise multiple regression analysis to derive the "best possible" models. The static microstructural change tests are effective in determining the microstructure changes which occurred during heat-up and soaking of the various titanium sheet alloys and during the cooling of the superplastically formed parts.

As demonstrated, these changes depend upon the test temperature and the time at temperature. The static grain growth characteristics of each material are accurately described, using the equation form set forth in Equation (4). The dynamic grain growth follows the relationship set forth in Equation (3). The superplastic deformation rate ($\dot{\epsilon}$) of each separate material is uniquely related to superplastic flow stress ($\sigma$), the temperature (T) and the instantaneous beta grain size (L) through the relationship of the generalized control Equation (2). The specific tests described hereinabove demonstrate the validity of these equations, since analysis of the data derived as the tests are conducted indicates a close correlation between predicted values (from Equations (2), (3) and (4)) and the actual values of grain size, strain rate, and strain rate sensitivity. The biaxial cone test data confirm the superplastic deformation models of the generalized equations developed using uniaxial tension test data.

The generalized Equations (2), (3) and (4) are thus extremely effective in enabling one to predict material parameters when forming production parts.

Although there have been described above specific methods of process modeling for superplastic forming of metal sheets as particular applications of a more generalized method for experimental research in accordance with the invention for the purpose of illustrating the manner in which the invention may be used to advantage, it will be appreciated that the invention is not limited thereto. Accordingly, any and all modifications, variations or equivalent arrangements which may occur to those skilled in the art should be considered to be within the scope of the invention as defined in the annexed claims.

I claim:

1. The method of modeling and optimizing superplastic forming of metal parts comprising the steps of:
   (a) selecting generalized control equations for superplastic forming which relate the forming conditions of stress, strain rate, temperature and time duration to particular properties of the metal to be formed, wherein said forming conditions are expressed in said equations as variables interrelated by particular constants corresponding to the properties of the metal;
   (b) conducting a series of predetermined tests of specimens of the metal to be formed in order to develop data for determining said constants;
   (c) applying a selected statistical analysis procedure to the developed data to determine the particular constants for the metal to be formed which will optimize the forming process for that metal; and
   (d) forming the metal by superplastic forming in accordance with said control equations using said optimizing constants.

2. The method of claim 1 further including, prior to performing step (b), the step of selecting particular categories of tests to be performed on the metal specimens, which tests involve testing the specimens under various conditions to determine selected metal properties.

3. The method of claim 2 wherein the categories of selected tests are: static microstructural change tests, high temperature uniaxial tension tests and high temperature biaxial cone tests.

4. The method of claim 2 further including the steps of selecting the conditions which are to be varied during said tests and determining the levels of the variable conditions at which the metal specimens are tested.

5. The method of claim 4 wherein one category of selected tests is static microstructural change tests, and wherein the variable conditions for such tests are: temperature, time at temperature and cooling rate.

6. The method of claim 5 wherein the static microstructural change tests involve tests at three different levels for each of the three variable conditions.

7. The method of claim 4 wherein one category of selected tests is high temperature uniaxial tension tests, and wherein the conditions to be varied during the high temperature uniaxial tension tests are: strain, strain rate and temperature.

8. The method of claim 7 wherein the high temperature uniaxial tension tests are conducted at three different levels for each of the three variable conditions thereof.

9. The method of claim 4 wherein one category of tests is high temperature biaxial cone tests, and wherein the conditions which are to be varied during said tests are: forming temperature, forming pressure and forming time.

10. The method of claim 9 wherein the high temperature biaxial cone tests are conducted at three different levels for each of the three variable conditions.

11. The method of claim 3 wherein each of the different categories of tests is conducted at three different levels for each of three variable conditions related to the corresponding category.

12. The method of claim 1 further including, following step (b), the step of recording data from the respective tests for statistical analysis.

13. The method of claim 1 wherein the selected statistical analysis procedure is multiple regression analysis.

14. The method of claim 13 further including the step of using a computer to perform stepwise multiple regression analysis on said data to develop the optimum values for said constants.

15. The method of claim 1 wherein said generalized control equations are:

$$L0 = L00 + A0\ t^{n0} \exp(-B0/T)$$

$$L = L0 + A1\ t^{n1}\dot{\epsilon}^{m1} \exp(-B1/T)$$

$$\dot{\epsilon} = \frac{A2\ \sigma^{n2}}{L^a\ T^b} \exp(-B2/T)$$

wherein:
$\dot{\epsilon}$ = strain rate

σ = stress
L = instantaneous beta phase grain size
T = temperature
L0 = beta phase grain size prior to initiation of forming but after soaking
L00 = initial beta phase grain size of the material
t = time
A0, n0, a, b, B0, A1, n1, m1, B1, A2, n2 and B2 are constants which are related to properties of the material to be formed.

16. The method of claim 15 wherein the selected statistical analysis procedure involves stepwise multiple regression analysis and wherein the constants A0, n0 and B0 are derived from the stepwise multiple regression analysis procedure applied to grain growth data developed from the static microstructural change tests.

17. The method of claim 15 wherein the selected statistical analysis procedure involves stepwise multiple regression analysis and wherein the constants A1, n1, m1 and B1 are derived from the stepwise multiple regression analysis procedure applied to grain growth data developed from the high temperature uniaxial tension tests.

18. The method of claim 15 wherein the selected statistical analysis procedure involves stepwise multiple regression analysis and wherein the constants a, b, A2, n2, and B2 are derived from the stepwise multiple regression analysis procedure applied to superplastic deformation data developed from the high temperature uniaxial tension and biaxial cone tests.

19. The method of modeling and optimizing the superplastic forming of metal parts comprising the steps of:
developing general control equations for superplastic forming relating selected forming variables of stress, strain rate, temperature and time duration to selected constants representative of particular properties of the metal to be formed;
conducting selected tests of specimens from the lot of the material to be formed at different selected levels of selected condition variables;
analyzing the results of said tests to derive specific values of the constants of said equations which are optimized for the particular material to be formed;
using said optimized values for the constants in said equations to control the superplastic forming of the material.

20. The method of claim 19 wherein said control equations are:

$$L0 = L00 + A0\, t^{n0} \exp(-B0/T)$$

$$L = L0 + A1\, t^{n1} \dot{\epsilon}^{m1} \exp(-B1/T)$$

$$\dot{\epsilon} = \frac{A2\, \sigma^{n2}}{L^a\, T^b} \exp(-B2/T)$$

wherein:
$\dot{\epsilon}$ = strain rate
σ = stress
L = instantaneous beta phase grain size
T = temperature
L0 = beta phase grain size prior to initiation of forming but after soaking
L00 = initial beta phase grain size of the material
t = time
A0, n0, a, b, B0, A1, n1, m1, B1, A2, n2 and B2 are constants which are related to properties of the material to be formed.

21. The method of claim 20 wherein the tests comprise static microstructural change tests, high temperature uniaxial tension tests and high temperature biaxial cone tests.

22. The method of claim 21 wherein the selected condition variables of the static microstructural change tests are: temperature, time at temperature and cooling rate.

23. The method of claim 21 wherein the selected condition variables of the high temperature uniaxial tension tests are: strain, strain rate and temperature.

24. The method of claim 21 wherein the selected condition variables of the high temperature biaxial cone tests are: forming temperature, forming pressure and forming time.

25. The method of claim 20 further including the steps of examining specimen microstructure to determine initial beta phase grain size and evaluating the specimen microstructure after the specimen tests have been performed to determine beta phase grain size prior to forming but after soaking.

26. The method of claim 19 wherein the step of analyzing test results comprises using a computer to perform stepwise multiple regression analysis of test data in order to develop the optimized values for said constants.

27. The method of claim 24 further including the step of analyzing experimentally formed specimens and comparing selected parameters thereof with predicted values derived from said equations in order to validate the equation constants derived from the test data.

* * * * *

UNITED STATES PATENT AND TRADEMARK OFFICE
CERTIFICATE OF CORRECTION

PATENT NO. : 4,658,362
DATED : April 14, 1987
INVENTOR(S) : Dhananjay D. Bhatt

It is certified that error appears in the above—identified patent and that said Letters Patent is hereby corrected as shown below:

```
Cover page Item [73] change "MxDonnell" to "McDonnell";
Cover page Item [75[ change "Cerritos, Calif." to "Eagle Rock,
Calif.";
     Col. 1, line 19, change "focsued" to "focused";
     Col. 2, line 50, change "structursal" to "structural";
             line 54, change "rheologcy" to "rheology";
     Col. 5, line 13, change "(or means free distance)" to "(or
mean free distance)";
             line 14, change "ratio ca be" to "ratio can be";
     Col. 5, line 64, change "equation" to "Equations".
```

Signed and Sealed this

Thirtieth Day of May, 1989

Attest:

DONALD J. QUIGG

Attesting Officer

Commissioner of Patents and Trademarks